United States Patent
Sato et al.

(10) Patent No.: US 8,077,348 B2
(45) Date of Patent: Dec. 13, 2011

(54) INFORMATION PROCESSING APPARATUS AND ITS METHOD THEREFORE FOR PRINTING AN IMAGE WITH A FIRST COMBINATION OF PROCESS COLORS MATERIALS AND A SECOND COMBINATION OF THE PROCESS COLOR MATERIALS AND A SPOT COLOR MATERIALS

(75) Inventors: Yoko Sato, Yokohama (JP); Shinichi Kato, Kawasaki (JP); Tsutomu Sakaue, Yokohama (JP); Ritsuko Otake, Kawasaki (JP); Yoichi Kashibuchi, Setaguya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 942 days.

(21) Appl. No.: 11/459,552

(22) Filed: Jul. 24, 2006

(65) Prior Publication Data

US 2007/0024880 A1 Feb. 1, 2007

(30) Foreign Application Priority Data

Jul. 27, 2005 (JP) ................................. 2005-217394

(51) Int. Cl.
*G06F 3/12* (2006.01)
(52) U.S. Cl. .............................. 358/1.9; 355/88; 358/2.1
(58) Field of Classification Search ............. 358/1.9–2.1
See application file for complete search history.

(56) References Cited

U.S. PATENT DOCUMENTS

| | | | | |
|---|---|---|---|---|
| 5,713,062 A * | 1/1998 | Goodman et al. | ............... | 399/49 |
| 6,717,699 B1 * | 4/2004 | Janssen et al. | ................. | 358/2.1 |
| 2003/0043414 A1 * | 3/2003 | Brady | .......................... | 358/3.06 |
| 2003/0097947 A1 * | 5/2003 | Caruthers et al. | ............. | 101/484 |
| 2003/0202822 A1 * | 10/2003 | Viturro et al. | ................. | 399/223 |
| 2004/0135859 A1 * | 7/2004 | German et al. | ................. | 347/95 |
| 2006/0061840 A1 | 3/2006 | Kashibuchi | .................. | 358/518 |
| 2007/0024880 A1 * | 2/2007 | Sato et al. | ...................... | 358/1.9 |
| 2007/0046961 A1 | 3/2007 | Kashibuchi et al. | ........... | 358/1.9 |
| 2009/0207447 A1 * | 8/2009 | Keane et al. | ................. | 358/1.15 |

FOREIGN PATENT DOCUMENTS

| | | |
|---|---|---|
| JP | A2002-247403 | 8/2002 |
| JP | 2002-283591 | 10/2002 |
| JP | 2003-233799 | 8/2003 |

OTHER PUBLICATIONS

Tanaka et al., Machine English Translation of JP Publication No. 2005/092530.*
Tanaka et al., Machine English Translation of JP Pub. No. 2005/092530.*
Office Action dated Jul. 10, 2009 in JP 2005-217394.

* cited by examiner

*Primary Examiner* — Benny Tieu
*Assistant Examiner* — Marcellus Augustin
(74) *Attorney, Agent, or Firm* — Fitzpatrick, Cella, Harper & Scinto

(57) ABSTRACT

There is known a technique of inputting the contents of image data and the use purpose of a print material and automatically selecting a combination of color materials appropriate for them. However, it cannot be confirmed before printing whether improvement of image quality commensurate with the cost and labor to input contents information can be obtained. To solve this problem, the ratio of the amount of the color material of a spot color used to that of the color materials of process colors used in input image data is calculated. The recommendation grade of printing using the spot color is determined on the basis of the ratio. Further, display of the recommendation grade is controlled.

9 Claims, 18 Drawing Sheets

FIG. 5

SWITCHING BETWEEN NORMAL MODE AND HIGH-QUALITY MODE

WHAT IS PRINT MODE?

■ IMAGE QUALITY :
  HIGH-QUALITY MODE RECOMMENDATION GRADE : ★★★

COMPARE PREVIEWS

SAMPLE PRINT (NUMBER OF PRINTS : 1 PRINT)
■ EXPECTED PRINT TIME :
  NORMAL MODE :      ABOUT 15 SEC
  HIGH-QUALITY MODE : ABOUT 20 SEC

■ PRINT FEE :
  NORMAL MODE :      ¥20
  HIGH-QUALITY MODE : ¥30

PLEASE SELECT PRINT MODE.

○ PRINT IN NORMAL MODE
⦿ PRINT IN HIGH-QUALITY MODE

PRINT START

CANCEL

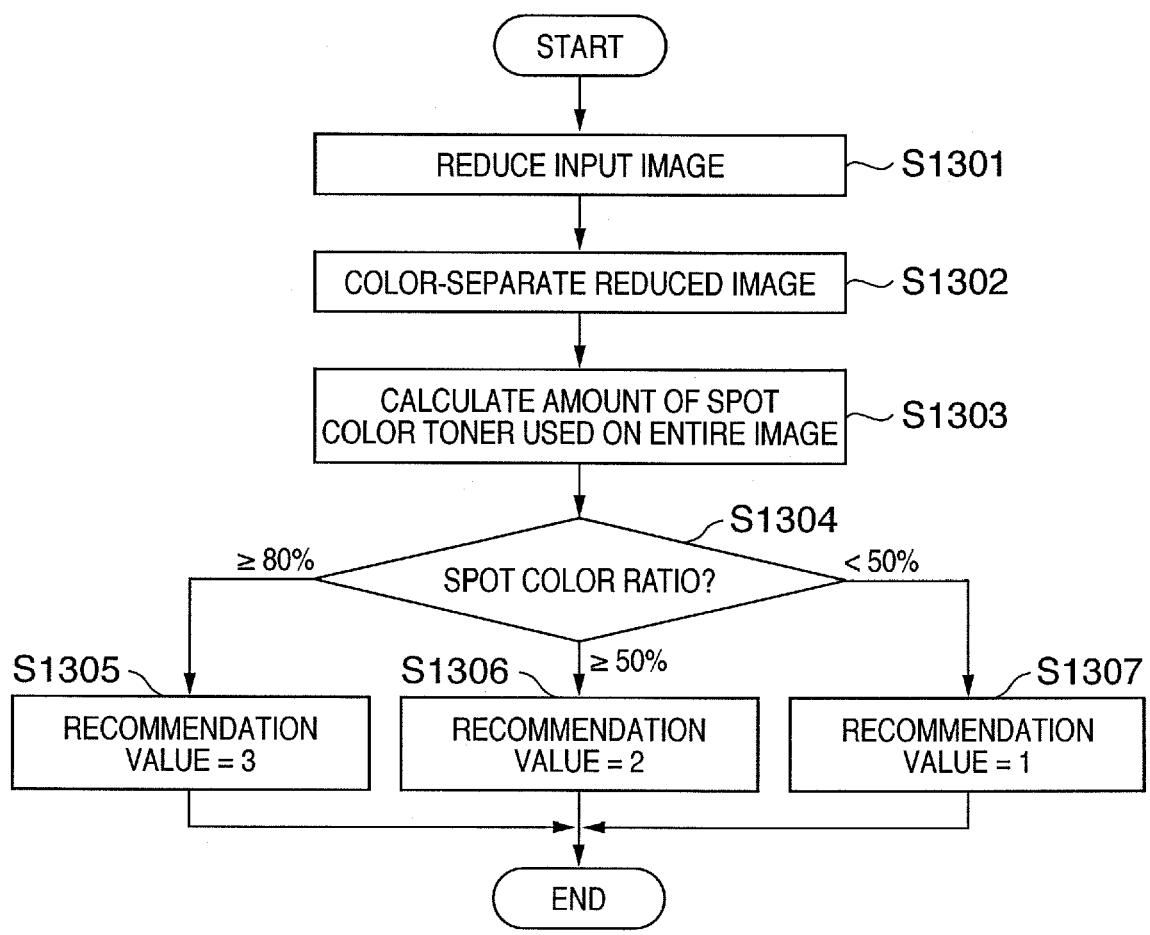

FIG. 7

| HIGH-QUALITY MODE RECOMMENDATION VALUE | 3 | 2 | 1 |
|---|---|---|---|
| SPOT COLOR RATIO | ≥80% | ≥50% | <50% |
| TILE SPOT COLOR RECOMMENDATION GRADE | ON IF SPOT COLOR RATIO PER TILE IS EQUAL TO OR HIGHER THAN 50% | | |

FIG. 9

| PRINT MODE | NUMBER OF PAGES | CONTROLLER TIME (SEC) | PRINTER TIME (SEC) | UNIT FEE (¥) |
|---|---|---|---|---|
| FOUR COLORS | 1 | 5 | 10 | 20 |
| FOUR COLORS + SPOT COLORS | 1 | 8 | 12 | 30 |

FIG. 11
COMPARE PREVIEWS IN NORMAL MODE AND HIGH-QUALITY MODE
YOU CAN SEE EFFECT OF HIGH-QUALITY MODE AT PORTION ENCLOSED WITH RED LINE.
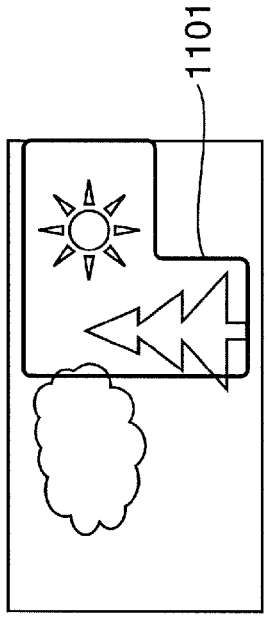
■ NORMAL MODE
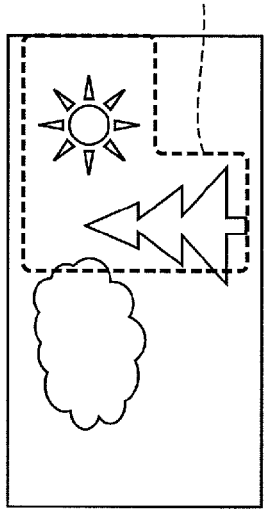
■ HIGH-QUALITY MODE
SAMPLE PRINT
PRINT TIME : 15 SEC
PRINT FEE : ¥20
PRINT TIME : 20 SEC
PRINT FEE : ¥30
PLEASE SELECT PRINT MODE.
○ PRINT IN NORMAL MODE
◉ PRINT IN HIGH-QUALITY MODE
PRINT START    CANCEL

FIG. 14

| OFF | OFF | ON | ON |
|-----|-----|-----|-----|
| OFF | OFF | ON | ON |
| OFF | OFF | ON | OFF |
| OFF | OFF | ON | OFF |

FIG. 17

SETTING OF AUTOMATIC PRINT MODE SWITCHING

IN THE FOLLOWING CASE, PRINT IN HIGH-QUALITY MODE.

☑ HIGH-QUALITY MODE RECOMMENDATION GRADE :

★★ OR MORE

AND

☐ DIFFERENCE IN (TOTAL) EXPECTED PRINT TIME :

(HIGH-QUALITY MODE) − (NORMAL MODE) ≦ 15 SEC

AND

☑ DIFFERENCE IN (TOTAL) PRINT FEE :

(HIGH-QUALITY MODE) − (NORMAL MODE) ≦ ¥ 500

WHAT IS PRINT MODE?

OK    CANCEL

INFORMATION PROCESSING APPARATUS AND ITS METHOD THEREFORE FOR PRINTING AN IMAGE WITH A FIRST COMBINATION OF PROCESS COLORS MATERIALS AND A SECOND COMBINATION OF THE PROCESS COLOR MATERIALS AND A SPOT COLOR MATERIALS

BACKGROUND OF THE INVENTION

1. Field of the Invention

The present invention relates to an image processing apparatus and method for processing image data in accordance with a combination of color materials including process colors and spot colors.

2. Description of the Related Art

Recently, printers using the color materials of spot colors in addition to four, cyan, magenta, yellow, and black process colors hit the market, and the user can easily print high-quality images. Types of spot colors are light colors such as light cyan and light magenta which are equal in hue to cyan and magenta and lower in density, metallic colors such as gold and silver, fluorescent colors including a fluorescent material, and a transparent color for adjusting gloss. Effects of using the color materials of spot colors include widening of the gamut, improvement of the gloss and quality, and improvement of the graininess and continuity of tone. Although most of printers additionally using spot colors are of the inkjet type, electrophotographic printers using spot colors are recently proposed, too.

When electrophotographic printer uses spot color toners in addition to four process colors, the output time may become longer than usual or the output charge may change depending on the number of toner colors, the printer configuration, and the type of paper for use. It is difficult for a user familiar with 4-color printing to recognize improvement of image quality at the expense of time and cost, and the user may hesitate about printing using spot colors.

Japanese Patent Laid-Open No. 2002-247403 proposes a technique of automatically selecting a combination of color materials appropriate for contents information by inputting, as the contents information, the contents of data to be printed and the use purpose of a print material. However, this technique requires labor to input contents information, and an image after printing cannot be confirmed. In other words, it cannot be confirmed before printing whether improvement of image quality commensurate with the necessary time (labor to input contents information) and cost can be obtained.

SUMMARY OF THE INVENTION

The first aspect of the present invention discloses an image processing apparatus comprising a processor, arranged to perform image processing for image data in accordance with a combination of color materials including process colors and a spot color, a first calculator, arranged to calculate a ratio of an amount of the color material of the spot color used to an amount of the color materials of the process colors used in input image data, a determiner, arranged to determine a recommendation grade of printing with a combination of the color materials of the process colors and the spot color on the basis of the ratio, and a display controller, arranged to control display of the recommendation grade.

The second aspect of the present invention discloses an image processing apparatus comprising a processor, arranged to perform image processing for image data in accordance with a combination of color materials including process colors and a spot color, and a generator, arranged to generate a preview image displaying an image area where use of the color material of the spot color is effective when printing is performed with a combination of the color materials of the process colors and the spot color.

The third aspect of the present invention discloses an image processing method for an image processing apparatus which has a processor arranged to perform image processing for image data in accordance with a combination of color materials including process colors and a spot color, the method comprising the steps of calculating a ratio of an amount of the color material of the spot color used to an amount of the color materials of the process colors used in input image data, determining a recommendation grade of printing with a combination of the color materials of the process colors and the spot color on the basis of the ratio, and controlling display of the recommendation grade.

The fourth aspect of the present invention discloses an image processing method comprising the steps of performing image processing for image data in accordance with a combination of color materials including process colors and a spot color, and generating a preview image displaying an image area where use of the color material of the spot color is effective when printing is performed with a combination of the color materials of the process colors and the spot color.

The present invention can provide the user with information for determining whether or not to print with a combination of color materials including process colors and spot colors.

Further features of the present invention will become apparent from the following description of exemplary embodiments (with reference to the attached drawings).

BRIEF DESCRIPTION OF THE DRAWINGS

FIG. 5 is a view showing an example of a UI which displays information necessary to switch between printing in four process colors (normal mode) and printing in four colors+ spot colors (high-quality mode);

FIG. 6 is a flowchart for explaining recommended print mode determination processing;

FIG. 7 is a table showing an example of a recommendation value setting table which sets a threshold for determining a high-quality mode recommendation value to an input image;

FIG. 9 is a table showing an example of a table which sets an expected time and fee per page in each print mode;

FIG. 11 is a view showing an example of a UI displayed when a "compare previews" button is pressed;

FIG. 14 is a view showing an example of the result of setting a spot color recommendation flag;

FIG. 17 is a view showing an example of a UI for setting automatic print mode switching in the fourth embodiment.

DESCRIPTION OF THE EMBODIMENTS

The image processing apparatus and method according to preferred embodiments of the present invention will be described in detail below with reference to the accompanying drawings. The following embodiments will explain an example of applying the present invention to a multi-functional peripheral equipment having a copying function, printer function, and facsimile function as a full-color image forming apparatus.

First Embodiment

[Configuration of Image Forming Apparatus]

Figure 1:
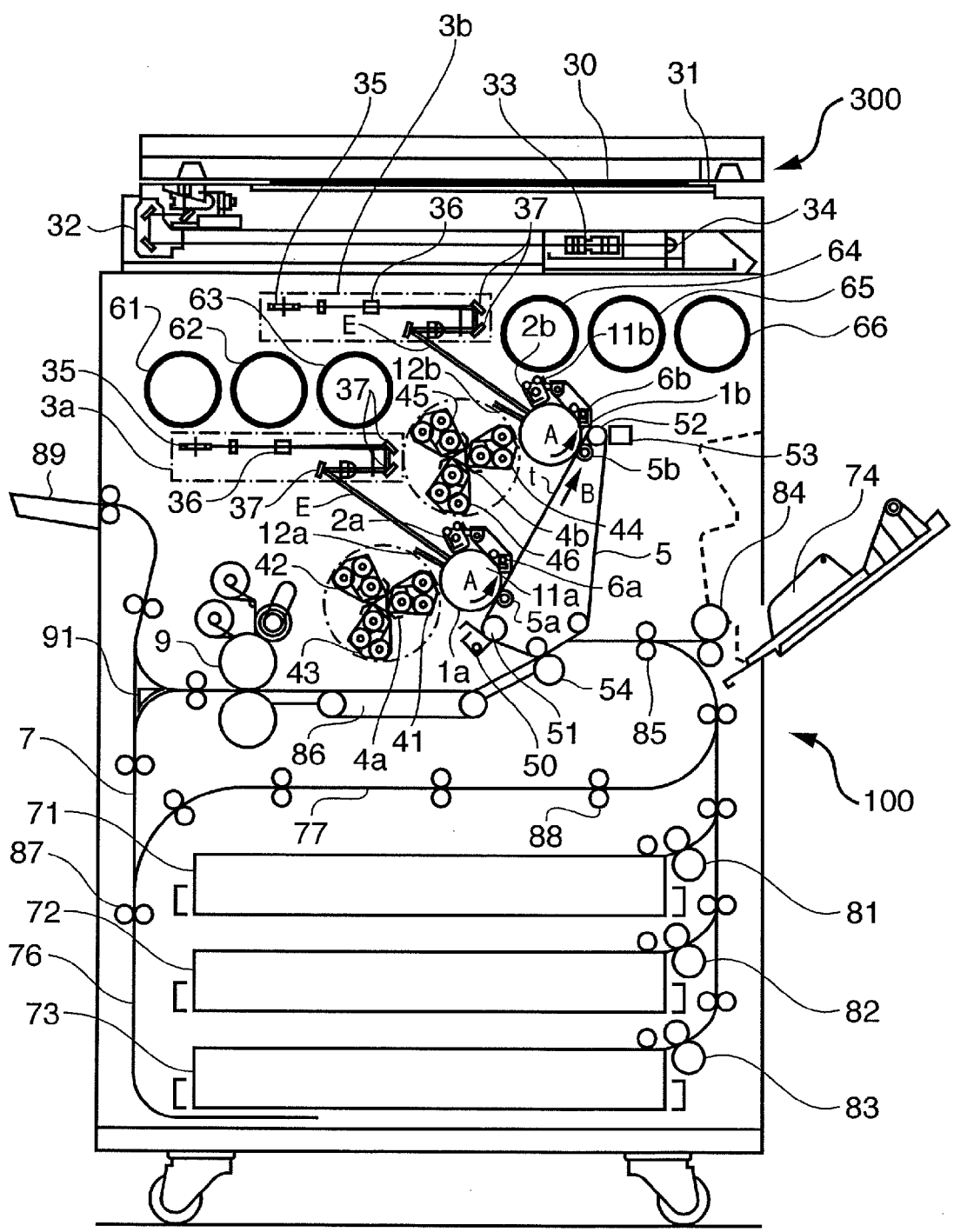
FIG. 1 is a schematic view showing a full-color image forming apparatus according to an embodiment.

FIG. 1 is a schematic view showing a full-color image forming apparatus (to be referred to as an "image forming apparatus" hereinafter) according to the embodiment.

The image forming apparatus has a reader 300 as the upper part and a printer 100 as the lower part.

The reader 300 exposes a document 30 set on a glass document table 31 with light from the lamp of a scanner unit 32, and moves the scanner unit 32 in the sub-scanning direction. Light reflected by the document 30 converges on a CCD sensor 34 via the mirror of the scanner unit 32 and a lens 33. Color-separated image signals output from the CCD sensor 34 are amplified by an amplifier circuit (not shown), and converted into R, G, and B image data by a video processing unit (not shown). The R, G, and B image data are stored in an image memory (not shown), and then output to the printer 100.

Note that the printer 100 receives image data output from the reader 300, also receives image data from a computer via a network, and receives a facsimile image signal via a telephone line. The operation of the printer 100 for image data output from the reader 300 will be described below.

The printer 100 has roughly two image forming sections: the first image forming section including a photosensitive drum 1a, and the second image forming section including a photosensitive drum 1b. These image forming sections have almost the same configuration (shape) for the purpose of cost reduction. That is, developing units 41 to 46 (to be described later) also have almost the same configuration and shape, and the printer 100 can operate even if the developing units 41 to 46 are exchanged.

The two photosensitive drums 1a and 1b serving as image carriers are held rotatably in directions indicated by arrows A shown in FIG. 1. The photosensitive drums 1a and 1b are surrounded with the following building components. The exposure system is made up of pre-exposure lamps 11a and 11b, corona chargers 2a and 2b, exposure portions 3a and 3b of the optical system, and potential sensors 12a and 12b. The developing system is made up of moving members (developing rotaries) 4a, and 4b serving as holding portions for rotary developing units, three developing units 41 to 43 and three developing units 44 to 46 which store developing materials of different colors in the corresponding holding portions, primary transfer rollers 5a and 5b, and cleaning units 6a and 6b.

For higher image quality, the number of developing units suffices to be five or more, and the first embodiment uses the six developing units 41 to 46. Toners stored in the respective developing units are as follows:

magenta toner in the developing unit 41;
cyan toner in the developing unit 42;
light magenta toner in the developing unit 43;
yellow toner in the developing unit 44;
black toner in the developing unit 45; and
light cyan toner the developing unit 46.

The developing materials (color materials) of dark and light colors are prepared by adjusting the amounts of pigments having the same spectral characteristic. More specifically, light magenta toner has the same spectral characteristic of a contained pigment as that of magenta toner, but has a smaller pigment content. Similarly, light cyan toner has the same spectral characteristic of a contained pigment as that of cyan toner, but has a smaller pigment content.

In addition, the developing rotaries 4a and 4b can also hold developing units (identical in shape to the above-mentioned developing units) which store toners (e.g., metallic toners such as gold and silver, and a fluorescent color toner including a fluorescent material) different in pigment spectral characteristic from cyan, magenta, yellow, and black.

Each developing unit stores a two-component developing material using a mixture of toner and carrier, but even a one-component developing material formed from only toner can be adopted without any problem.

The use of dark and light colors of magenta and cyan aims to dramatically improve the reproducibility of a light-color image, in other words, to reduce the graininess of a light-color area.

In forming an image, the photosensitive drums 1a and 1b rotate in the directions indicated by the arrows A, are discharged by the pre-exposure lamps 11a and 11b, and uniformly charged on the surfaces by the chargers 2a and 2b. The exposure portions 3a and 3b convert image data input from the reader 300 into optical signals by laser output portions (not shown). The optical signals (laser beams E) are reflected by polygon mirrors 35 to irradiate exposure positions on the surfaces of the photosensitive drums 1a and 1b via lenses 36 and reflecting mirrors 37. As a result, electrostatic latent images are formed for each toner color (separated color) on the photosensitive drums 1a and 1b.

Then, the developing rotaries 4a and 4b are rotated to move the developing units 41 and 44 to developing positions on the photosensitive drums 1a and 1b. The developing units 41 and 44 are operated (the developing bias is applied to the developing units 41 and 44) to develop the electrostatic latent images on the photosensitive drums 1a and 1b. Images of developing materials (toner images) containing a resin and pigment as a substrate are formed on the photosensitive drums 1a and 1b. The electrostatic latent images are developed by the developing units 42 and 45 in the next developing and by the developing units 43 and 46 in the second next developing.

Note that the developing units 41 to 46 are refilled with toners at predetermined timings on occasion from toner storage portions (hoppers) 61 to 66 for the respective colors which are arranged between the exposure portions 3a and 3b or beside the exposure portion 3b, so as to keep the toner ratio (or toner amount) in each developing unit constant.

Toner images formed on the photosensitive drums 1a and 1b are sequentially transferred by the primary transfer rollers 5a and 5b onto an intermediate transfer member (intermediate transfer belt) 5 serving as a transfer medium, so that they are superposed on each other. At this time, the primary transfer bias is applied to the primary transfer rollers 5a and 5b.

The photosensitive drums 1a and 1b are arranged in contact with a flat surface (transfer surface t) formed by the intermediate transfer member 5 which is looped between a driving roller 51 and a driven roller 52 and driven in a direction indicated by an arrow B shown in FIG. 1. The primary transfer rollers 5a and 5b are arranged at positions facing the photosensitive drums 1a and 1b.

A sensor 53 which detects positional errors and the densities of images transferred from the photosensitive drums 1a and 1b is arranged at a position facing the driven roller 52. Control to correct the image density of the image forming section, the toner refill amount, the image write timing, the image write start position, and the like is performed at any time on the basis of information obtained by the sensor 53.

After the above-described formation, developing, and primary transfer of electrostatic latent images are repeated three times in the two image forming sections, a full-color toner image of sequentially superposed toner images of the six colors is formed on the intermediate transfer member 5. The full-color toner image on the intermediate transfer member 5 is secondarily transferred at once on a print sheet. At this time, the secondary transfer bias is applied to a secondary transfer roller 54.

A transfer cleaning device 50 is arranged at a position facing the driving roller 51. The transfer cleaning device 50 removes toner left on the intermediate transfer member 5 after the end of secondary transfer. The driving roller 51 pushes the intermediate transfer member 5 toward the transfer cleaning device 50 to bring the intermediate transfer member 5 into contact with the transfer cleaning device 50 and clean the intermediate transfer member 5. After the end of cleaning, the intermediate transfer member 5 moves apart from the transfer cleaning device 50. The cleaned intermediate transfer member 5 prepares for the next image formation.

Print sheets are conveyed one by one to the image forming section from a print sheet cassette 71, 72, or 73 or a manual feed tray 74 by a pickup roller 81, 82, 83, or 84. A skew is corrected by registration rollers 85, and a print sheet is supplied to the secondary transfer position in synchronism with the sheet feed timing.

A print sheet on which a full-color toner image is transferred is conveyed by a convey belt 86, and the toner image is fixed by a heat roller fixing unit 9. Thereafter, the print sheet is discharged onto a delivery tray 89 or a post-processing apparatus (not shown).

When images are formed on the two surfaces of a print sheet, a convey path switching guide 91 is driven to guide a print sheet having passed through the heat roller fixing unit 9 to a reverse path 76 via a vertical convey path 7. Then, a reverse roller 87 is rotated in the opposite direction to set the trailing end of the print sheet guided to the reverse path 76 as the leading end. The print sheet is withdrawn from the reverse path 76 and guided to a double-sided convey path 77. The print sheet passes through the double-sided convey path 77, and sent to the registration rollers 85 by double-sided convey rollers 88. A full-color image is formed on the other surface of the print sheet by the above-described image forming process.

[Controller]

Figure 2:
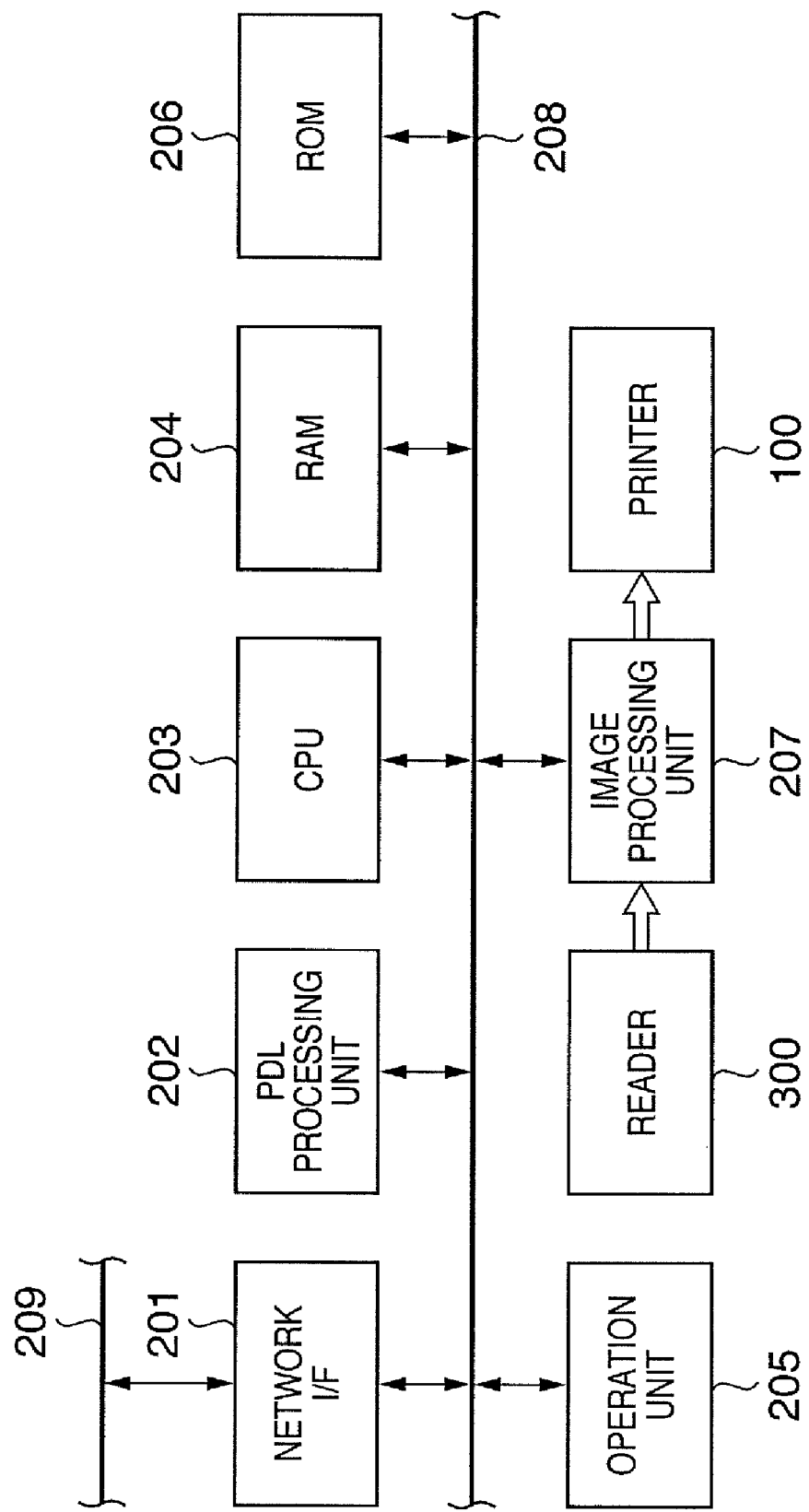
FIG. 2 is a block diagram showing the configuration of a controller which controls the image forming apparatus shown in FIG. 1.

FIG. 2 is a block diagram showing the configuration of a controller which controls the image forming apparatus shown in FIG. 1.

A CPU 203 of the controller uses a RAM 204 as a work memory, and executes programs stored in a ROM 206 to control building components (to be described below) via a system bus 208.

An operation unit 205 receives an instruction from the user, notifies the CPU 203 of it, and displays the apparatus state or the like under the control of the CPU 203. When the user designates a job containing read of an image such as copying of an image via the operation unit 205, the CPU 203 controls the reader 300 to input image data obtained by reading a document image to an image processing unit 207.

The image processing unit 207 performs image processing corresponding to the job for the received image data. For example, for a copy job, the image processing unit 207 performs image processing suitable for a printer output for image data input from the reader 300, and outputs the processed image data to the printer 100.

Although not shown in FIG. 2, the system bus 208, reader 300, and printer 100 are connected to each other via a predetermined interface. The CPU 203 can acquire status information representing the operation states of the reader 300 and printer 100 to control their operations.

A network interface (I/F) 201 is connected to a network 209 such as a local area network (LAN), communicates with a computer and server connected to the network 209, and exchanges various commands and data. For example, when a print job containing image data (to be referred to as "PDL data" hereinafter) described in a description language such as a page description language is received from an external computer, the CPU 203 supplies the PDL data to a PDL processing unit 202. The PDL processing unit 202 transfers, to the image processing unit 207, image data rendered by interpreting the PDL data. The image processing unit 207 performs image processing appropriate for a printer output for the input image data, and outputs the processed image data to the printer 100. Accordingly, the print job is executed.

When a scan job is received from an external computer, the CPU 203 causes the reader 300 to read an image. The CPU 203 causes the image processing unit 207 to generate image data corresponding to the read image, and transmits the image data via the network I/F 201 to the destination such as the computer which has issued the scan job. Note that the image data is generated in a data format designated by the scan job.

The controller further incorporates a facsimile transmission/reception unit, an interface with a telephone line, and the like, but a description of them will be omitted.

[Image Processing Unit]

Figure 3:
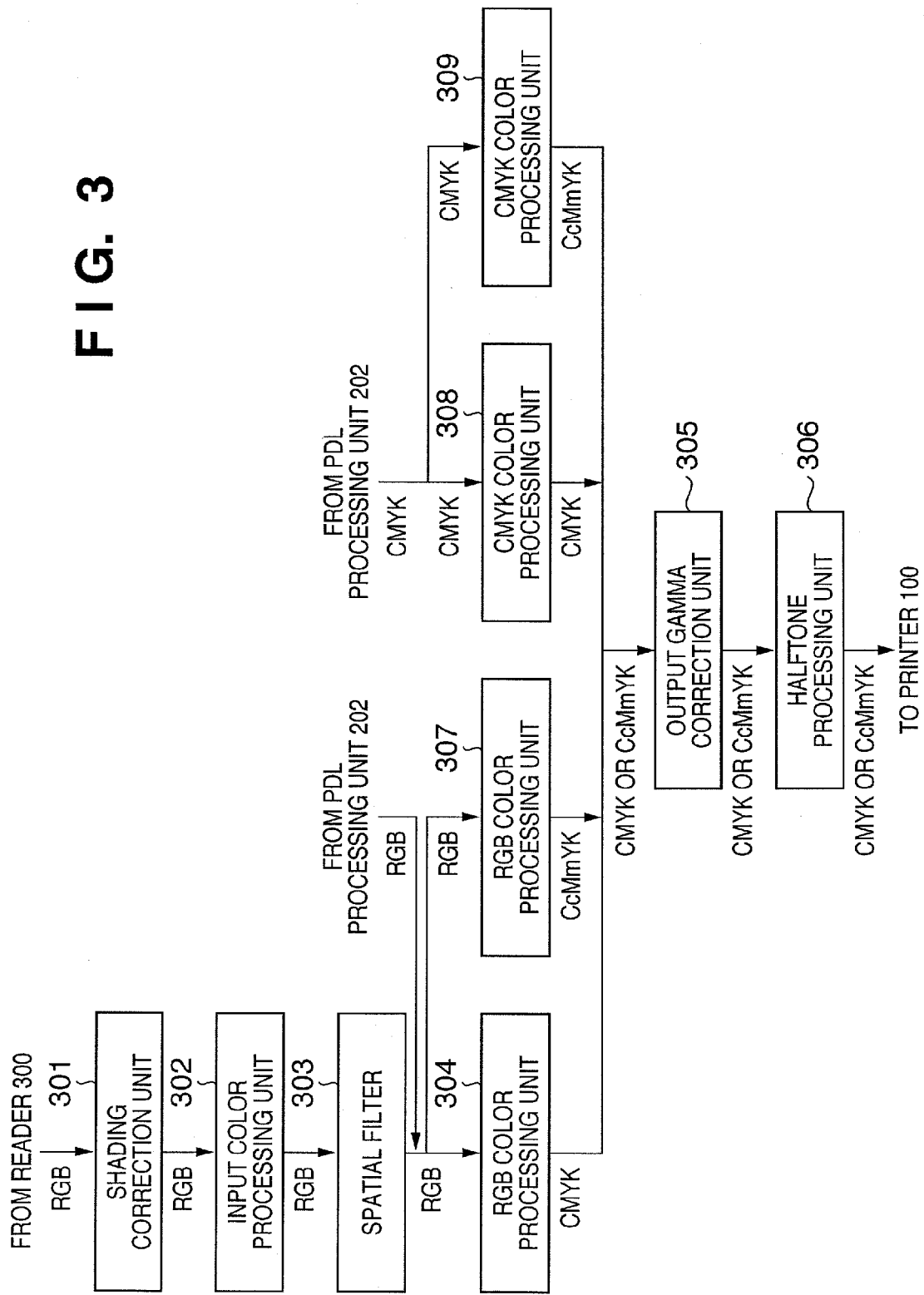
FIG. 3 is a block diagram showing the functional configuration of an image processing unit.

FIG. 3 is a block diagram showing the functional configuration of the image processing unit 207.

In many cases, image data output from the reader 300 is RGB image data of 8 bits (256 tone levels) per pixel. In the image processing unit 207, input RGB image data undergoes white level correction by a shading correction unit 301, and input masking processing by an input color processing unit 302. These processes remove color grayness and the like generated by the spectral characteristic of the CCD. Further, the frequency characteristic of the input image data is corrected by a spatial filter 303.

In the image processing unit 207, when ROB image data obtained by the above processing or RGB image data (8 bits for each color) generated by the PDL processing unit 202 is separated into four colors, it is color-separated into C, M, Y, and K signals (10 bits for each color) by an RGB color processing unit 304. When RGB image data is separated into six colors, it is color-separated into C, c, M, m, Y, and K signals (10 bits for each color) by an RGB color processing unit 307. The PDL processing unit 202 sometimes outputs CMYK image data. In this case, when CMYK image data is separated into four colors, they are color-separated into C, M, Y, and K signals by a CMYK color processing unit 308. When CMYK image data is separated into six colors, it is color-separated into C, c, M, m, Y, and K signals by a CMYK color processing unit 309.

In the image processing unit 207, color-separated signals are input into an output gamma correction unit 305. The output gamma correction unit 305 corrects (gamma correction) the output characteristic of each color-separated signal by using a one-dimensional lookup table (1DLUT) independent for each color. A halftone processing unit 306 performs, for the color-separated signal, pseudo halftone processing corresponding to the number of tones and the resolution which can be reproduced by the printer 100. The image processing unit 207 outputs the C, M, Y, and K signals or C, c, M, m, Y, and K signals having undergone the pseudo halftone processing to the printer 100. Note that the number of tones and the resolution of the printer 100 are, e.g., 4 bits and 600 dpi, but are not limited to them. Pseudo halftone processing uses well-known screen ruling or error diffusion.

[Switching of Print Mode]

Figure 4:
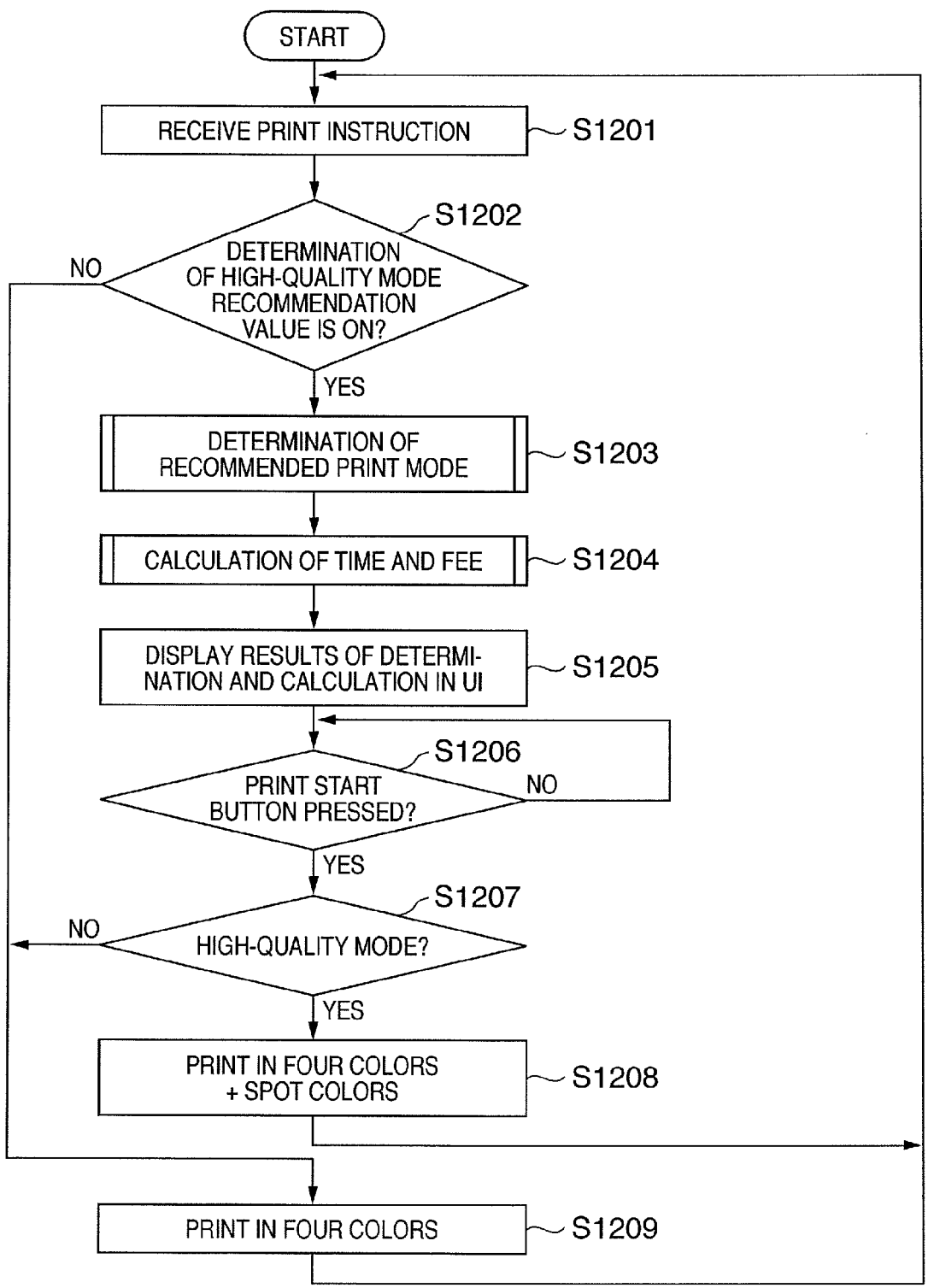
FIG. 4 is a flowchart showing print mode switching processing executed by a CPU.

FIG. 4 is a flowchart showing print mode switching processing executed by the CPU 203.

The CPU 203 receives a print instruction from the user via the operation unit 205 (S1201). The CPU 203 determines the setting of the operation unit 205 (S1202). If "determination of high-quality mode recommendation value" is OFF, general 4-color printing is done (S1209), and the processing returns to step S1201. If "determination of high-quality mode recommendation value" is ON, the CPU 203 determines a recommended print mode (details of which will be described later) (S1203). The ON/OFF state of "determination of high-quality mode recommendation value" is set by the user via the operation unit 205 before issuing a print instruction (for example, pressing the print start key of the operation unit 205).

The CPU 203 calculates the time and fee required for printing (details of which will be described later) (S1204), and displays the determination result of the recommended print mode, the necessary time, and the fee in the user interface (UI) of the operation unit 205 (S1205).

FIG. 5 is a view showing an example of a UI which displays information necessary to switch between printing in four process colors (to be referred to as a "normal mode" hereinafter) and printing in four colors+spot colors (to be referred to as a "high-quality mode" hereinafter). As a material used by the user to properly determine a print mode, this UI explicitly shows a "high-quality mode recommendation grade" representing the determination result of a recommended print mode, and the times and fees required for printing in the respective print modes. Note that the recommendation level is represented by the number of pentacles (three at maximum) as the high-quality mode recommendation grade. However, the recommendation level may be displayed by a numeral value (1, 2, or 3) or a character (e.g., low, middle, or high), or displayed graphically so as to fill the interior of a bar in three stages.

In this case, spot colors include light colors such as light cyan and light magenta which are equal in hue to cyan and magenta and lower in density, metallic colors such as gold and silver, fluorescent colors including a fluorescent material, and a transparent color for adjusting gloss.

The CPU 203 waits until the user selects a print mode from the UI shown in FIG. 5 and presses the print start key (S1206). If the user presses the print start key, the CPU 203 determines the selected mode (S1207). If the normal mode is selected, printing in four colors is performed (S1209). If the high-quality mode is selected, printing in four colors+spot colors (spot colors are added) is performed (S1208). After that, the processing returns to step S1201. When the normal mode is selected, color separation is executed by the RGB color processing unit 304 or CMYK color processing unit 308 shown in FIG. 3. When the high-quality mode is selected, color separation is executed by the RGB color processing unit 307 or CMYK color processing unit 309 shown in FIG. 3.

Note that the UI may be displayed using not only the operation unit 205, but also an external computer connected via the network I/F 201. Alternatively, the UI can also be displayed via a wide-area network such as the Internet to prompt the user to operate the UI.

Determination of Recommended Print Mode

FIG. 6 is a flowchart for explaining the processing (S1203) of determining a recommended print mode.

An input image is reduced to a proper resolution (S1301) in order to shorten the processing time.

The reduced image is color-separated into two images for the normal mode and high-quality mode (S1302). At this time, color separation for the high-quality mode uses the RGB color processing unit 307 for RGB data and the CMYK color processing unit 309 for CMYK data. Color separation for the normal mode uses the RGB color processing unit 304 for RGB data and the CMYK color processing unit 308 for CMYK data.

The amount of spot color toners used on an entire image is calculated (S1303). This can be calculated as a sum of the signal values of spot colors c and m after color separation.

It is determined whether a ratio (to be referred to as "spot color ratio" hereinafter) of the amount of the toners of the spot colors used to that of the toners of the four process colors used is equal to or larger than a preset threshold (S1304). The high-quality mode recommendation value corresponding to the "high-quality mode recommendation grade" is set in accordance with the determination result (S1305 to S1307).

FIG. 7 is a table showing an example of a recommendation value setting table which sets a threshold for determining a high-quality mode recommendation value to an input image.

FIG. 7 shows an example of setting the spot color ratio in three stages. For example, the high-quality mode recommendation value is "3 (three pentacles)" if the spot color ratio is 80% or more, "2 (two pentacles)" if the spot color ratio is 50% or more, and "1 (one pentacle)" if the spot color ratio is less than 50%. In order to explicitly indicate a portion of a high recommendation value of the high-quality mode in each image area, a tile spot color recommendation grade (binary value of ON or OFF) is set for each area (tile) prepared by dividing an image at a predetermined interval. As the threshold of the tile spot color recommendation grade, for example, the spot color ratio per tile is set. In the example shown in FIG. 7, the threshold is set to a spot color ratio of 50% per tile. Note that items described in the table shown in FIG. 7 change depending on the high-quality mode recommendation value determination method.

Calculation of Time and Fee Required for Printing

Figure 8:
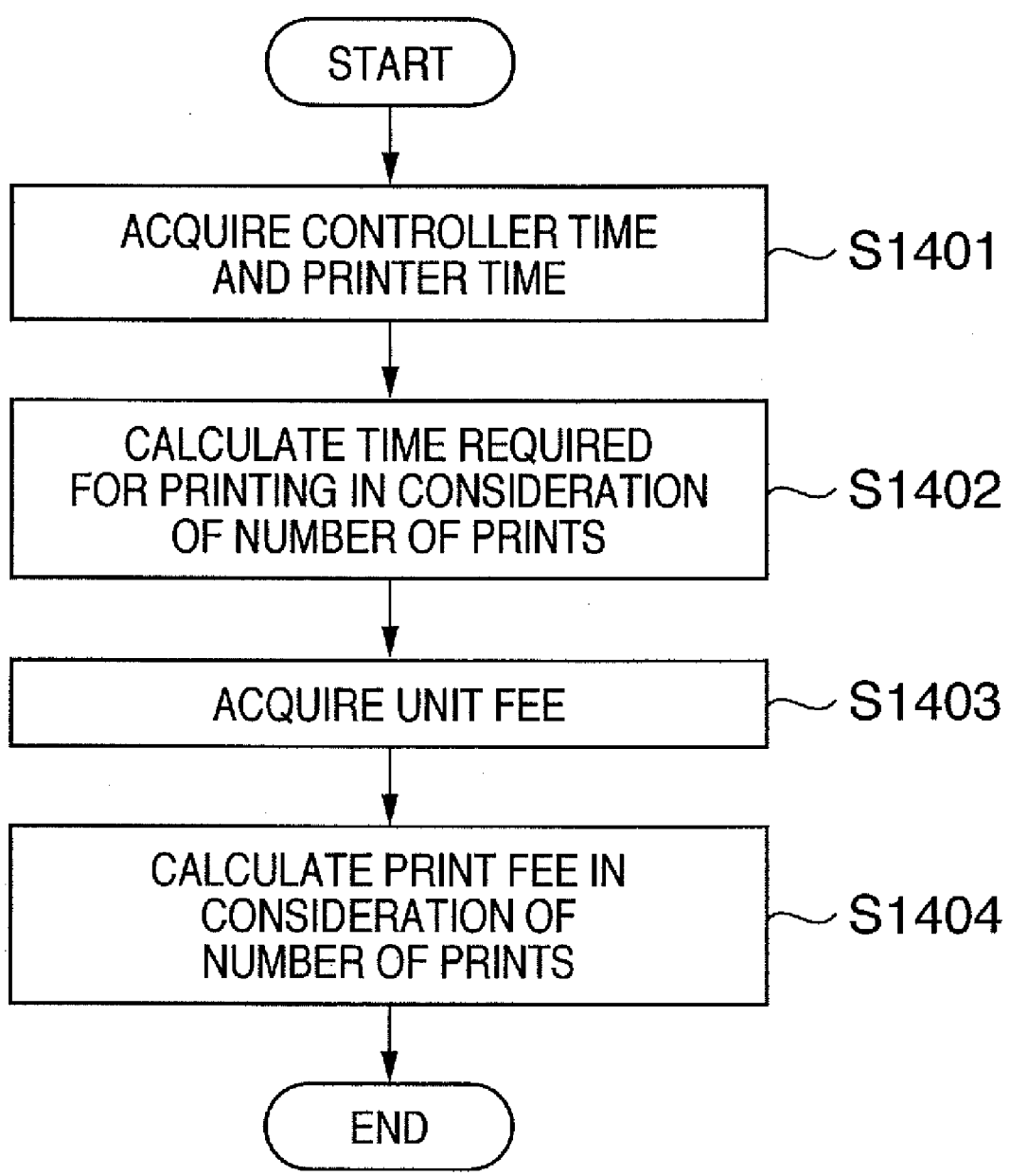
FIG. 8 is a flowchart for explaining calculation of the time and fee required for printing.

FIG. 8 is a flowchart for explaining calculation (S1204) of the time and fee required for printing. FIG. 9 is a table showing an example of a table which sets an expected time and fee per page in each print mode. This table is saved in a nonvolatile memory managed by the CPU 203, and designed rewritable, as needed (e.g., upon a change of the fee).

The CPU 203 acquires, from the table shown in FIG. 9, a controller time required by the controller for image processing such as rendering and color separation, and a printer time required by the printer 100 for a printing process (S1401). The CPU 203 calculates a time required for printing in consideration of the number of prints set by the user via the operation unit 205 (S1402). For example, when the number of prints is one, the time required for printing is 5+10=15 sec in the normal mode and 8+12=20 sec in the high-quality mode. Even if the number of prints is more than one, the controller time hardly changes, and thus the time required for printing is 5+10×5=55 sec for, e.g., five prints in the normal mode and 8+12×5=68 sec. in the high-quality mode.

The CPU 203 acquires a unit fee from the table shown in FIG. 9 (S1403), and calculates the print fee in consideration of the number of prints (S1404). For example, when the number of prints is one, the fee is ¥20 in the normal mode and ¥30 in the high-quality mode. When the number of prints is five, the fee is 20>5=¥100 in the normal mode and 30×5=¥150 in the high-quality mode.

Although not shown in FIG. 9, the unit fee may correspond to the print paper type (plain paper, wood free paper, glossy paper, mat paper, photo paper, or the like) used in printing. In this case, the CPU 203 acquires a unit fee from the table shown in FIG. 9 in accordance with the print paper type set by the user via the operation unit 205, and calculates the fee.

The type of image data may be determined from Exif data. It is also possible to give attention to reproduction of a specific color such as the skin color for which the effect of using light color toner is expected, and determine a high-quality mode recommendation value in accordance with the area of the specific color used in the image.

Second Embodiment

The image processing apparatus and method according to the second embodiment of the present invention will be explained below. In the second embodiment, the same reference numerals as those in the first embodiment denote the same parts, and a detailed description thereof will be omitted.

In the second embodiment, not only the high-quality mode recommendation value is displayed, but also a preview image is displayed in the UI, or a sample print is output to visually present the difference between the normal mode and the high-quality mode.

Figure 10:
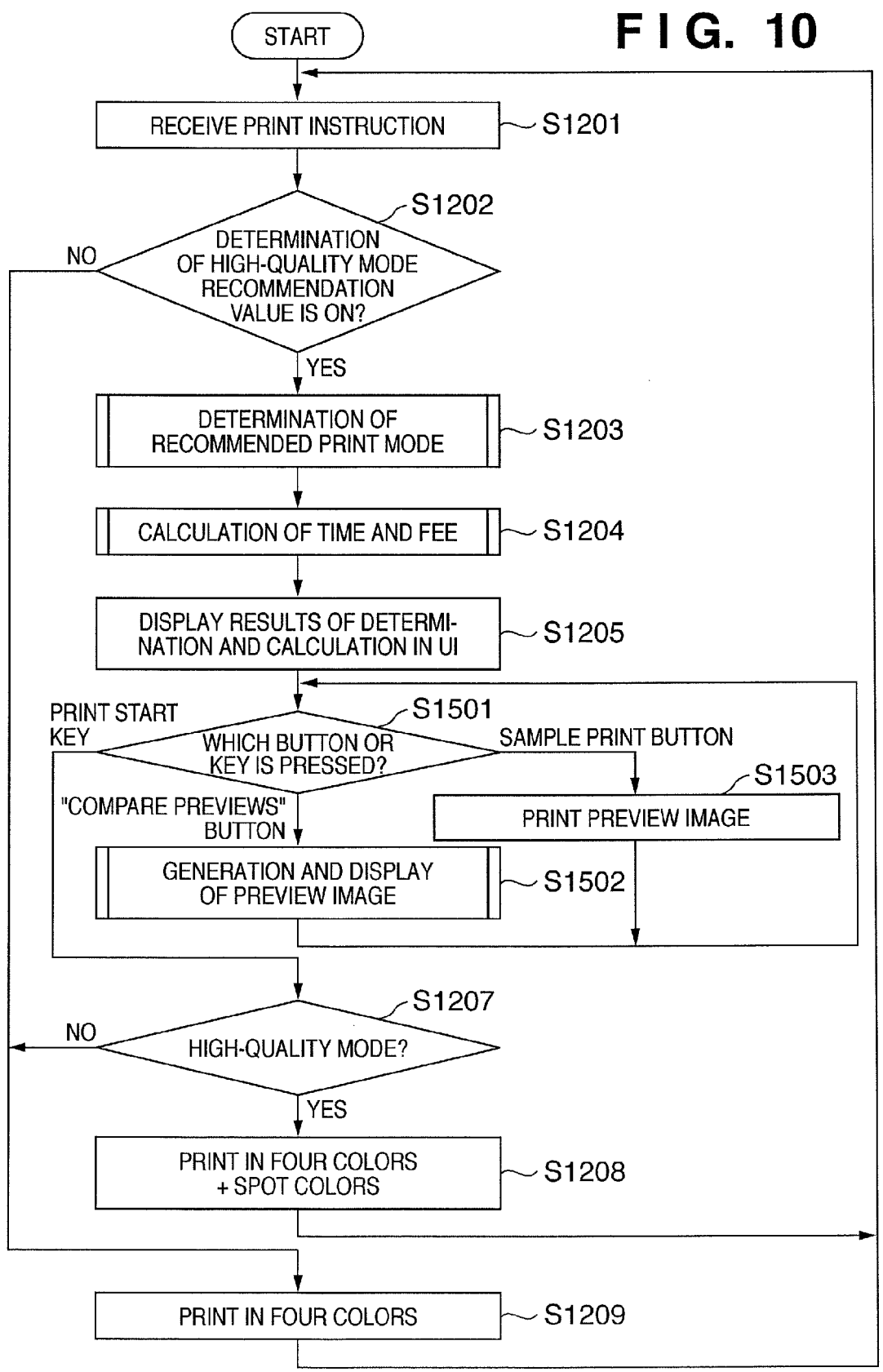
FIG. 10 is a flowchart showing print mode switching processing executed by a CPU in the second embodiment.

FIG. 10 is a flowchart showing print mode switching processing executed by a CPU 203 in the second embodiment. Note that steps S1201 to S1205 and S1207 to S1209 are the same processes as those in FIG. 4, and a detailed description thereof will be omitted.

The CPU 203 determines which of buttons and the print start key in a UI (see FIG. 5) displayed in step S1205 is pressed by the user (S1501). If the user presses a "compare previews" button, a preview image is generated and displayed (details of which will be described later) (S1502). If the user presses a "sample print" button, a preview image is printed (S1503), and the processing returns to step S1501. If the "sample print" button is pressed before a preview image is generated, the preview image is generated before it is printed. If the print start key is pressed, processing from step S1207 is executed.

FIG. 11 is a view showing an example of a UI displayed when the "compare previews" button is pressed.

Print previews in the normal mode and high-quality mode are displayed side by side, and a portion exhibiting a large effect of the high-quality mode is enclosed with, e.g., a red line 1101. A portion exhibiting a large effect of the high-quality mode may be enclosed with, e.g., a red broken line 1102 in a preview in the normal mode. This setting can enhance the visibility of a portion having a large effect of the high-quality mode. The print time and print fee are displayed below the preview to facilitate selection by the user.

When the "sample print" button is pressed, preview images in the two modes are printed side by side, similar to the preview comparison window shown in FIG. 11. An enclosure indicating a portion exhibiting a large effect of the high-quality mode is also printed.

Generation of Preview Image

Figure 12:
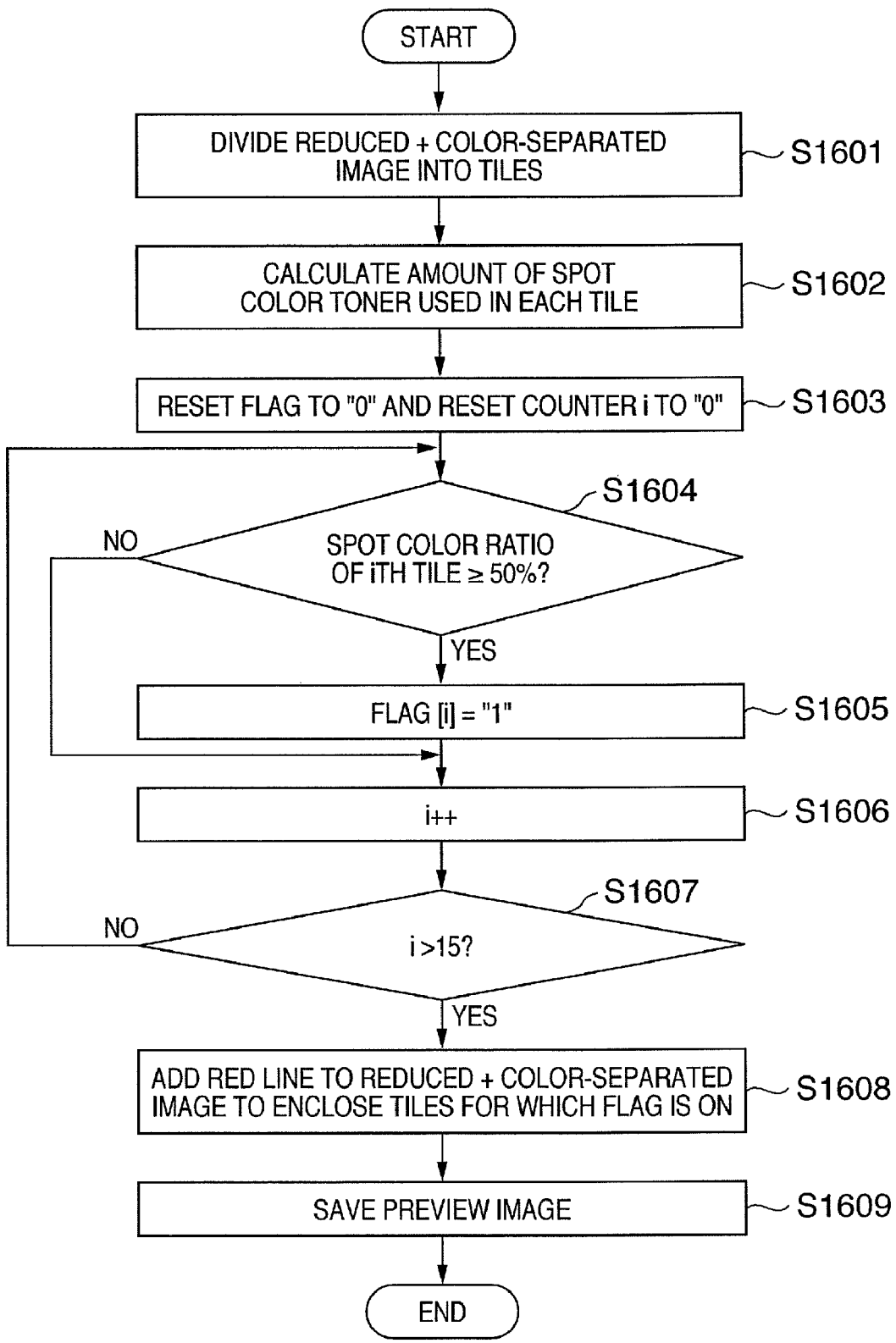
FIG. 12 is a flowchart for explaining preview image generation processing.

FIG. 12 is a flowchart for explaining the processing (S1502) of generating a preview image.

Figure 13:
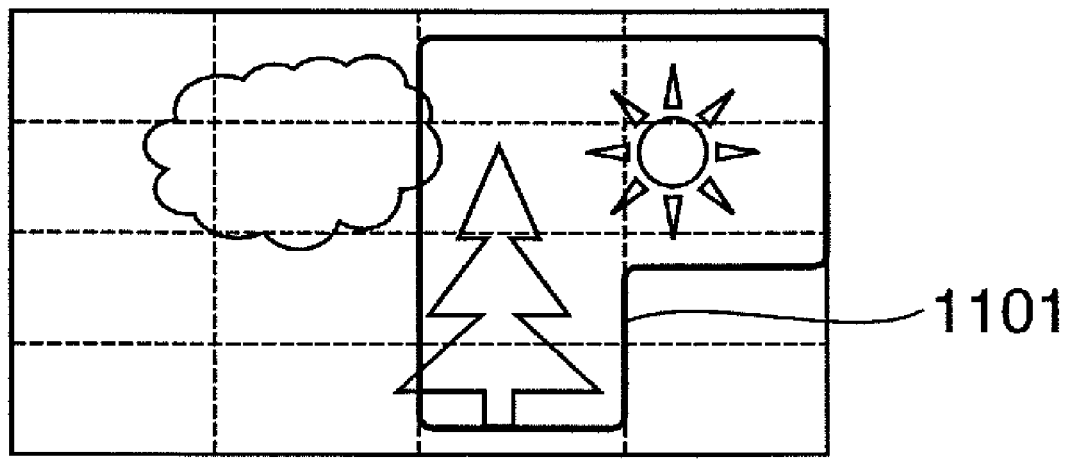
FIG. 13 is a view for explaining tile division.

A reduced+color-separated image for the high-quality mode is divided into tiles, as shown in FIG. 13 (S1601). FIG. 13 is a view showing an example of dividing an image into 4×4 tiles. Needless to say, the division number is not limited to 4×4.

The amount of spot color toner used in each tile is calculated (S1602). The flag (described with reference to FIG. 7) representing the tile spot color recommendation grade of each tile is reset to "0" (OFF), and the counter i is reset to "0" (S1603).

It is determined whether the spot color ratio of the ith tile is equal to or higher than the threshold (e.g., 50%) of the recommendation value setting table (FIG. 7) (S1604). If the spot color ratio of the ith tile is equal to or higher than the threshold, a flag [i] corresponding to the ith tile is set to "1" (ON) (S1605) Then, the counter i is incremented (S1606), and the processing from steps S1604 to S1607 is repeated until it is determined in step S1607 that the flags of all tiles are set (for 16 tiles, i>15).

FIG. 14 is a view showing an example of the result of setting a flag representing the tile spot color recommendation grade.

After that, the red line 1101 is added to reduced+color-separated images in the normal mode and high-quality mode, as shown in FIG. 13, to enclose tiles for which the flag representing the tile spot color recommendation grade is "ON" (S1608). The images to which the red line 1101 is added are stored as preview images in the RAM 204 or the like (S1609).

Before a series of processes shown in FIG. 12, the reduction ratio of an input image may be changed to change the resolution such that the resolution is low (e.g., 72 dpi) for a preview image or high (e.g., 150 dpi) for a sample print image.

When a preview image is displayed in the UI, gamut mapping is executed to set the profile of a printer 100 as a source profile and that of the monitor of an operation unit 205 as a destination profile, and an image after mapping is displayed in the UI. Gamut mapping is performed by the CPU 203, a PDL processing unit 202, or an image processing unit 207. Gamut mapping can be omitted if only an area having a large effect of the high-quality mode is presented without displaying the printing color. The UI suffices to display one image in which an area having a large effect is enclosed.

Third Embodiment

The image processing apparatus and method according to the third embodiment of the present invention will be explained below. In the third embodiment, the same reference numerals as those in the first and second embodiments denote the same parts, and a detailed description thereof will be omitted.

The third embodiment will explain an example of determining a recommended print mode for images of pages to be printed.

Figure 15:
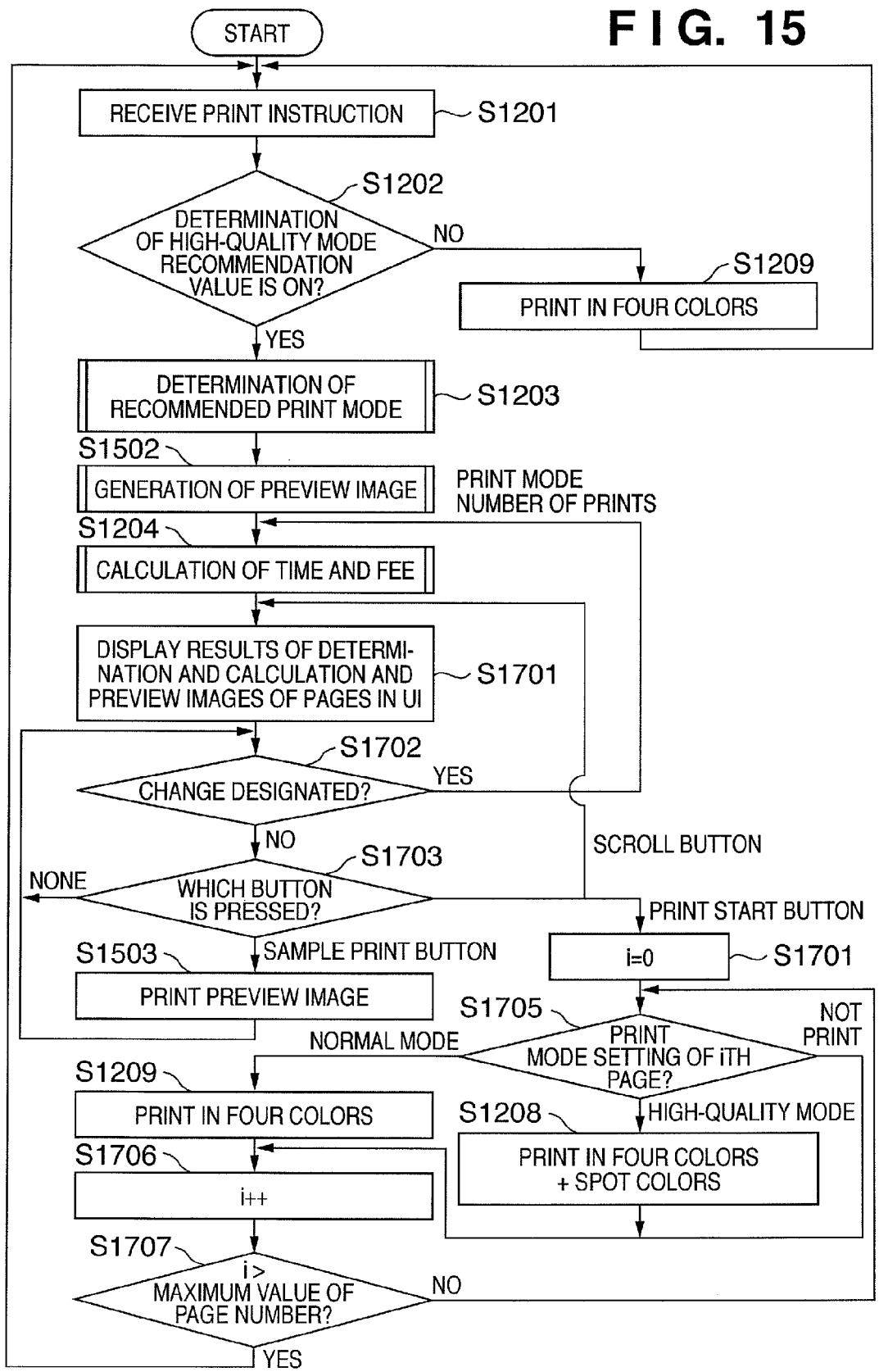
FIG. 15 is a flowchart showing print mode switching processing executed by a CPU in the third embodiment.

FIG. 15 is a flowchart showing print mode switching processing executed by a CPU 203 in the third embodiment. Note that details of steps S1201 to S1204, S1502, S1503, and S1208 and S1209 are the same processes as those in FIGS. 4 and 10, and a detailed description thereof will be omitted. Before issuing a print instruction, the user scans the images (images to be printed) of pages by a scanner unit 32, or inputs PDL data of pages (images to be printed) from an external computer. Assume that these scanned images or rendered images are stored in a RAM 204.

In the third embodiment, after determination of a recommended print mode (S1203), generation of a preview image (S1502), and calculation of the time and fee (S1204), the CPU 203 displays the determination and calculation results and the preview images of pages in the UI (S1701).

Figure 16:
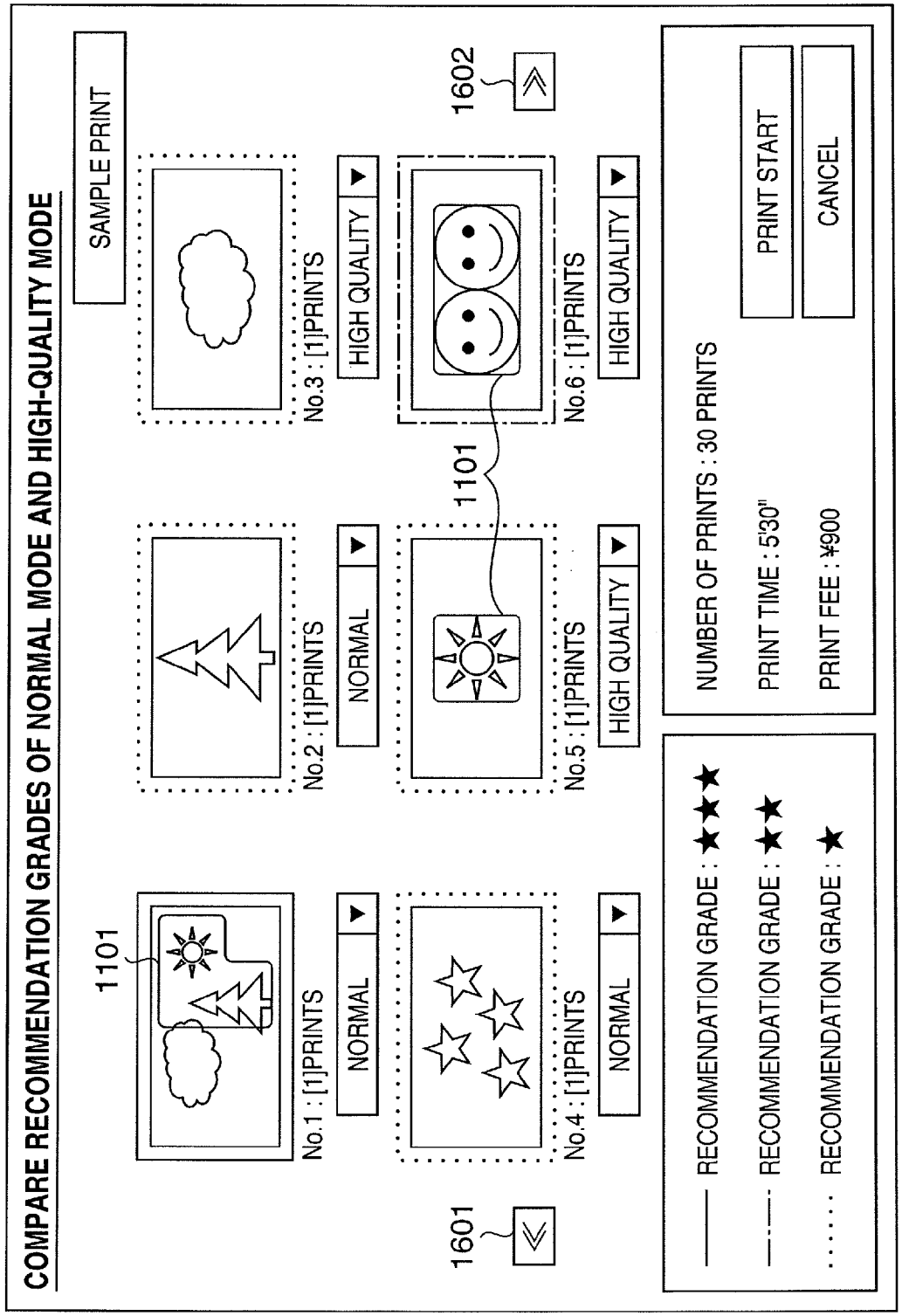
FIG. 16 is a view showing a display example of a UI in the third embodiment.

FIG. 16 is a view showing a display example of the UI in the third embodiment.

The preview images of images to be printed are displayed by, e.g., six pages on one UI window, and scrolled with scroll buttons 1601 and 1602. The frame of each preview image is enclosed with, e.g., a solid line (recommendation value: 3), a chain line (recommendation value: 2), or a dotted line (recommendation value: 1), and the line type represents a high-quality mode recommendation value. A portion exhibiting a large effect of the high-quality mode is enclosed with, e.g., a red line 1101.

Display of the page number (No. 1, 2, . . . ), a drop-down menu box for changing the print mode, and a print count input box are arranged below each preview image. The user can select "normal mode", "high-quality mode", or "not print" from the drop-down menu box for each page. A case wherein "0" is input in the print count input box is also treated similarly to "not print". Further, the total print count, print time, and fee are displayed.

The CPU 203 determines whether the print count or print mode is changed in the UI shown in FIG. 16 (S1702). If the print count or print mode is changed, the CPU 203 calculates the time and fee again (S1204), and updates the UI display (total print count, print time, and fee) (S1701).

If neither the print count nor print mode is changed, the CPU 203 determines a button pressed by the user (S1703). If the user presses the scroll button 1601 or 1602, the processing returns to step S1701 to scroll preview images, and returns to step S1702. If no button is pressed, the processing returns to step S1702. Although not shown in FIG. 15, if a "cancel" button is pressed, the CPU 203 determines that the print instruction is canceled, and erases images to be printed which are stored in the RAM 204. Then, the processing returns to step S1201.

If the "sample print" button is pressed in step S1703, the CPU 203 prints a preview image (S1503), and the processing returns to step S1702. In printing preview images, images of one page in the normal mode and high-quality mode may be arranged side by side, similar to the second embodiment, or images of pages in the normal mode and high-quality mode may be arranged side by side, similar to the UI display. Alternatively, images of one or a plurality of pages in the normal mode and high-quality mode may be arranged side by side and printed for only pages for which the high-quality mode is selected in the UI.

If the print start key is pressed, the CPU 203 resets the page counter i to 0 (S1704). The CPU 203 determines the print mode of the ith page (S1705), and prints in accordance with the set print mode and print count (S1208 and S1209). A page for which "not print" is selected or the print count=0 is skipped.

After that, the CPU 203 increments the page counter i (S1706), and determines whether the page counter i has exceeded the maximum value of the page number (S1707). If the page counter i does not exceed the maximum value, the processing returns to step S1705; if it has exceeded the maximum value, returns to step S1201. After the processing ends, images to be printed which are stored in the RAM 204 are deleted.

Fourth Embodiment

The image processing apparatus and method according to the fourth embodiment of the present invention will be explained below. In the fourth embodiment, the same reference numerals as those in the first to third embodiments denote the same parts, and a detailed description thereof will be omitted.

An example in which printing is automatically done in the high-quality mode when the determination result of a recommended print mode satisfies a preset condition will be explained as the fourth embodiment.

FIG. 17 is a view showing an example of a UI for setting automatic print mode switching in the fourth embodiment.

The user can select determination items at check boxes for the high-quality mode recommendation grade, the difference in expected print time, and the difference in print fee, and can set the determination values. When the switching conditions set by the user are met, a CPU 203 prints in the high-quality mode. In the example of FIG. 17, printing in the high-quality mode is executed when the high-quality mode recommendation value is given by two pentacles (high-quality mode recommendation value: 2) or more, and the difference in print fee is ¥500 or less.

Figure 18:
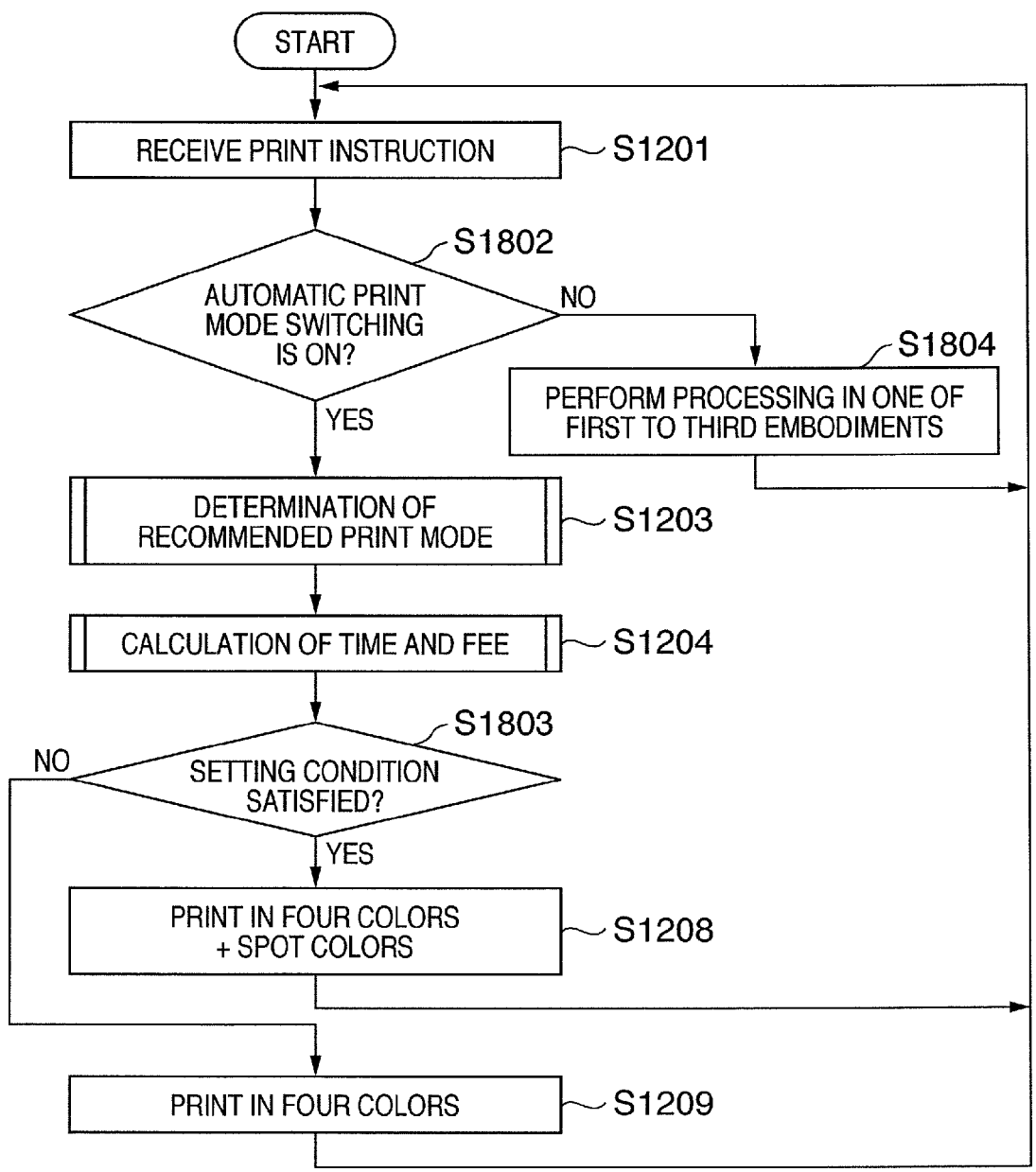
FIG. 18 is a flowchart for explaining automatic print mode switching executed by a CPU in the fourth embodiment.

FIG. 18 is a flowchart for explaining automatic print mode switching executed by the CPU 203 in the fourth embodiment.

When the CPU 203 receives a print instruction from the user via an operation unit 205 (S1201), it determines the setting of the operation unit 205 (S1802). If "automatic print mode switching" is OFF, the CPU 203 executes processing in one of the first to third embodiments (S1804), and the processing returns to step S1201.

If "automatic print mode switching" is ON, the CPU 203 executes determination of a recommended print mode (S1203) and calculation of the time and fee (S1204). Note that the ON/OFF state of "automatic print mode switching" and the switching condition are set by the user via the operation unit 205 before issuing a print instruction (for example, pressing the print start key of the operation unit 205).

The CPU 203 determines whether the high-quality mode recommendation value, print time, and/or print fee satisfies the switching condition set by the user (S1803). If the switching condition is satisfied, printing is done in the high-quality mode (S1208); if it is not satisfied, printing is done in the normal mode (S1209). Then, the processing returns to step S1201.

The above-described embodiments can provide the user with information for determining whether or not to print with a combination of color materials including process colors and spot colors in an image forming apparatus which prints in spot colors in addition to the four process colors. This information includes the recommendation grade of printing in four colors+spot colors, an image area having a large effect, and the time and fee required for printing. The user can determine whether he can obtain an image quality commensurate with the time and cost required from a print containing spot colors. That is, the user can select a print mode in accordance with what he weights (image quality, cost, or time).

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japenese Patent Application No. 2005-217394 filed on Jul. 27, 2005, which is hereby incorporated by reference herein in its entirety.

What is claimed is:

1. An apparatus having a printing unit which can print an image with a first combination of process color materials, and can print the image with a second combination of the process color materials and a spot color material, the apparatus comprising:
    a processor, arranged to perform color-separate processing on image data in accordance with a combination of color materials to generate the color-separated image data to be outputted to the printing unit;
    a first calculator, arranged to calculate a percentage of an amount of the spot color material used to an amount of the process color materials used in printing of the image data based on a result of the color-separate processing regarding the image data;
    a second calculator, arranged to calculate necessary times and fees in a case that the image data is printed with the first combination and in a case that the image data is printed with the second combination;
    a comparator, arranged to compare the percentage with a predetermined value; and
    a controller, arranged to control display of a message, wherein the message displayed in a case that the percentage is greater than or equal to the predetermined value recommends the printing with the second combination, and the message displayed in a case that the percentage is less than the predetermined value recommends the printing with the first combination,
    wherein the controller further displays the necessary times and fees, such that one of the first combination and the second combination is selected for printing after display of the recommendation and the necessary times and fees.

2. The apparatus according to claim 1,
    wherein the controller receives a user instruction which designates the combination of the color materials to be used in the printing of the image data, and controls the color separation processing of the processor for the image data in accordance with the user instruction.

3. The apparatus according to claim 1, wherein a color of the spot color material comprises at least one of light cyan, light magenta, a fluorescent color, a metallic color such as gold and silver, and a transparent color.

4. The apparatus according to claim 1, further comprising a generator, arranged to generate a first preview image in a case that the first combination is used in the printing of the image data, and a second preview image in a case that the second combination is used in the printing of the image data,
    wherein the controller further displays the second preview images.

5. The apparatus according to claim 4, wherein the generator generates, based on a calculation result of the percentage by the first calculator, the second preview image displaying an image area where use of the spot color material is effective.

6. The apparatus according to claim 4, wherein in a case that the controller receives a user instruction which designates preview printing, the controller controls the processor to output the color-separated image data of the first and second preview images to the printing unit.

7. The apparatus according to claim 1, wherein in a case that the percentage is less than 50%, a recommendation grade is low,
    wherein in a case that the percentage is greater than or equal to 50% and less than 80%, the recommendation grade is medium, and
    wherein in a case that the percentage is greater than or equal to 80%, the recommendation grade is high.

8. A method for an apparatus having a printing unit which can print an image with a first combination of process color materials, and can print the image with a second combination of the process color materials and a spot color material, the method comprising:

using a processor to perform the steps of:

performing color-separate processing on image data in accordance with a combination of color materials to generate the color-separated image data to be outputted to the printing unit;

calculating a percentage of an amount of the spot color material used to an amount of the process color materials used in printing of the image data based on a result of the color-separate processing regarding the image data;

calculating necessary times and fees in a case that the image data is printed with the first combination and in a case that the image data is printed with the second combination;

comparing the percentage with a predetermined value;

controlling display of a message, wherein the message displayed in a case that the percentage is greater than or equal to the predetermined value recommends the printing with the second combination, and the message displayed in a case that the percentage is less than the predetermined value recommends the printing with the first combination; and displaying the necessary times and fees, such that one of the first combination and the second combination is selected for printing after display of the recommendation and the necessary times and fees.

9. A non-transitory computer-readable medium storing a computer-executable program for causing a computer to perform a method for an apparatus having a printing unit which can print an image with a first combination of process color materials, and can print the image with a second combination of the process color materials and a spot color material, the method comprising the steps of:

performing color-separate processing on image data in accordance with a combination of color materials to generate the color-separated image data to be outputted to the printing unit;

calculating a percentage of an amount of the spot color material used to an amount of the process color materials colors used in printing of the image data based on a result of the color-separate processing regarding the image data;

calculating necessary times and fees in a case that the image data is printed with the first combination and in a case that the image data is printed with the second combination;

comparing the percentage with a predetermined value; and controlling display of a message, wherein the message displayed in a case that the percentage is greater than or equal to the predetermined value recommends the printing with the second combination, and the message displayed in a case that the percentage is less than the predetermined value recommends the printing with the first combination; and displaying the necessary times and fees, such that one of the first combination and the second combination is selected for printing after display of the recommendation and the necessary times and fees.

* * * * *